US007485867B2

(12) United States Patent
Hakamata

(10) Patent No.: US 7,485,867 B2
(45) Date of Patent: Feb. 3, 2009

(54) EXPOSURE SYSTEM AND HOLE ARRAY

(75) Inventor: Kazuo Hakamata, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 466 days.

(21) Appl. No.: 10/879,730

(22) Filed: Jun. 30, 2004

(65) Prior Publication Data

US 2005/0002317 A1    Jan. 6, 2005

(30) Foreign Application Priority Data

Jul. 1, 2003   (JP)   ............................. 2003-189467
Jul. 3, 2003   (JP)   ............................. 2003-191252

(51) Int. Cl.
*G21K 1/02* (2006.01)

(52) U.S. Cl. .................... 250/363.1; 378/149

(58) Field of Classification Search ................. 250/581, 250/363.1, 363.06; 378/149, 147
See application file for complete search history.

(56) References Cited

U.S. PATENT DOCUMENTS

| 3,787,685 | A | * | 1/1974 | Grenier ...................... 250/394 |
| 3,850,517 | A | | 11/1974 | Stephany et al. |
| 4,176,275 | A | | 11/1979 | Korn et al. |
| 4,788,426 | A | * | 11/1988 | Kuehnle ...................... 250/580 |
| 5,231,655 | A | * | 7/1993 | Wei et al. ..................... 378/147 |
| 5,263,075 | A | * | 11/1993 | McGann et al. ............. 378/147 |
| 5,440,146 | A | | 8/1995 | Steffen et al. |
| 5,444,266 | A | * | 8/1995 | Takeda et al. ............... 250/586 |
| 5,477,438 | A | | 12/1995 | Nakata et al. |
| 5,510,626 | A | | 4/1996 | Nelson et al. |
| 5,617,131 | A | * | 4/1997 | Murano et al. .............. 347/233 |
| 6,268,614 | B1 | | 7/2001 | Imai |
| 6,353,227 | B1 | * | 3/2002 | Boxen ...................... 250/363.1 |
| 2001/0025936 | A1 | | 10/2001 | Shoji |
| 2004/0046134 | A1 | | 3/2004 | Hakamata |

FOREIGN PATENT DOCUMENTS

| JP | 08110203 A * | 4/1996 |
| JP | 10-210213 A | 8/1998 |
| WO | WO 02/30561 A2 | 4/2002 |

OTHER PUBLICATIONS

Korn, Donald M. "A Method of Electronic Readout of Electrophotographic and Electroradiographic Images," Journal of Applied Photographic Engineering, vol. 4, No. 4, Fall 1978, pp. 178-182.

* cited by examiner

*Primary Examiner*—David P Porta
*Assistant Examiner*—Mark R Gaworecki
(74) *Attorney, Agent, or Firm*—Sughrue Mion, PLLC

(57) ABSTRACT

A reading light exposure system scans an image recording medium with a reading light beam. The reading light exposure system includes a line source emitting the reading light beam, an optical means which converges the reading light beam emitted from the line source in a direction perpendicular to the longitudinal direction of the line source, and a pinhole array having a number of pinholes which limit the angle of divergence of the reading light beam in the longitudinal direction of the line source with respect to the optical axis of the optical means. The length of each of the pinholes in the direction perpendicular to the longitudinal direction of the line source is larger than the length thereof in the longitudinal direction of the line source.

16 Claims, 11 Drawing Sheets

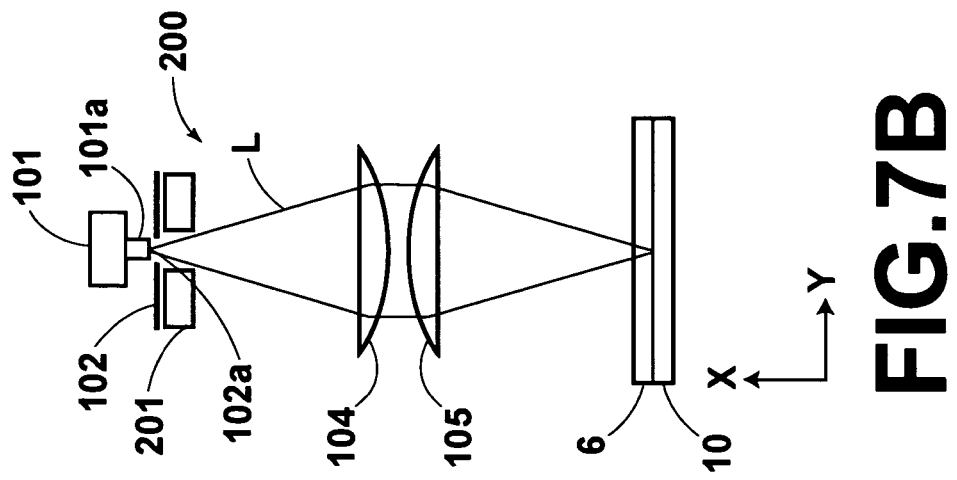
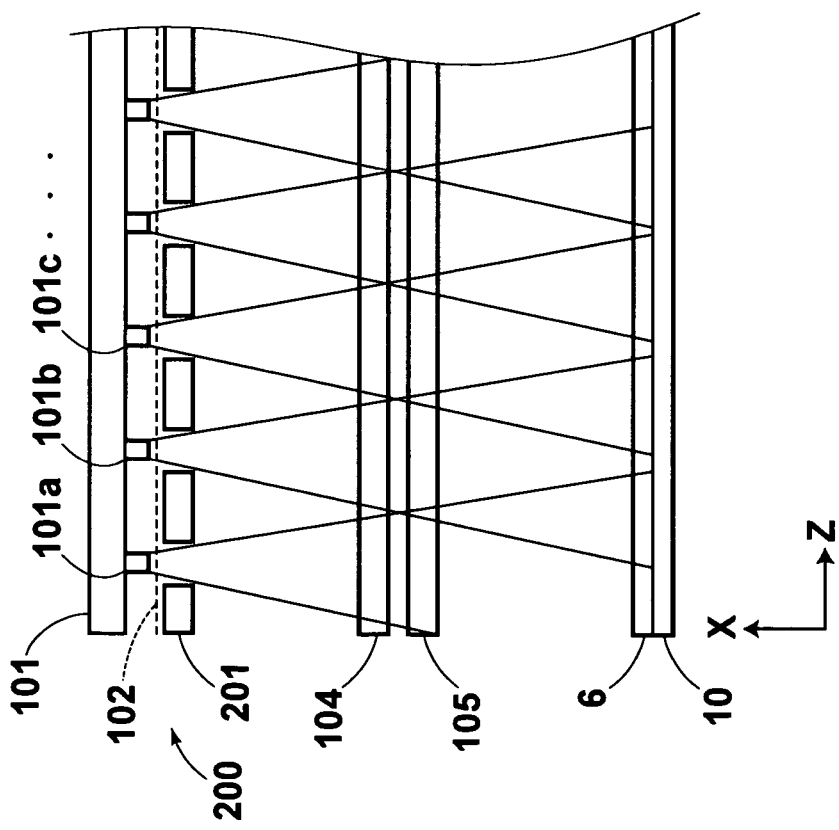
FIG. 7B
FIG. 7A

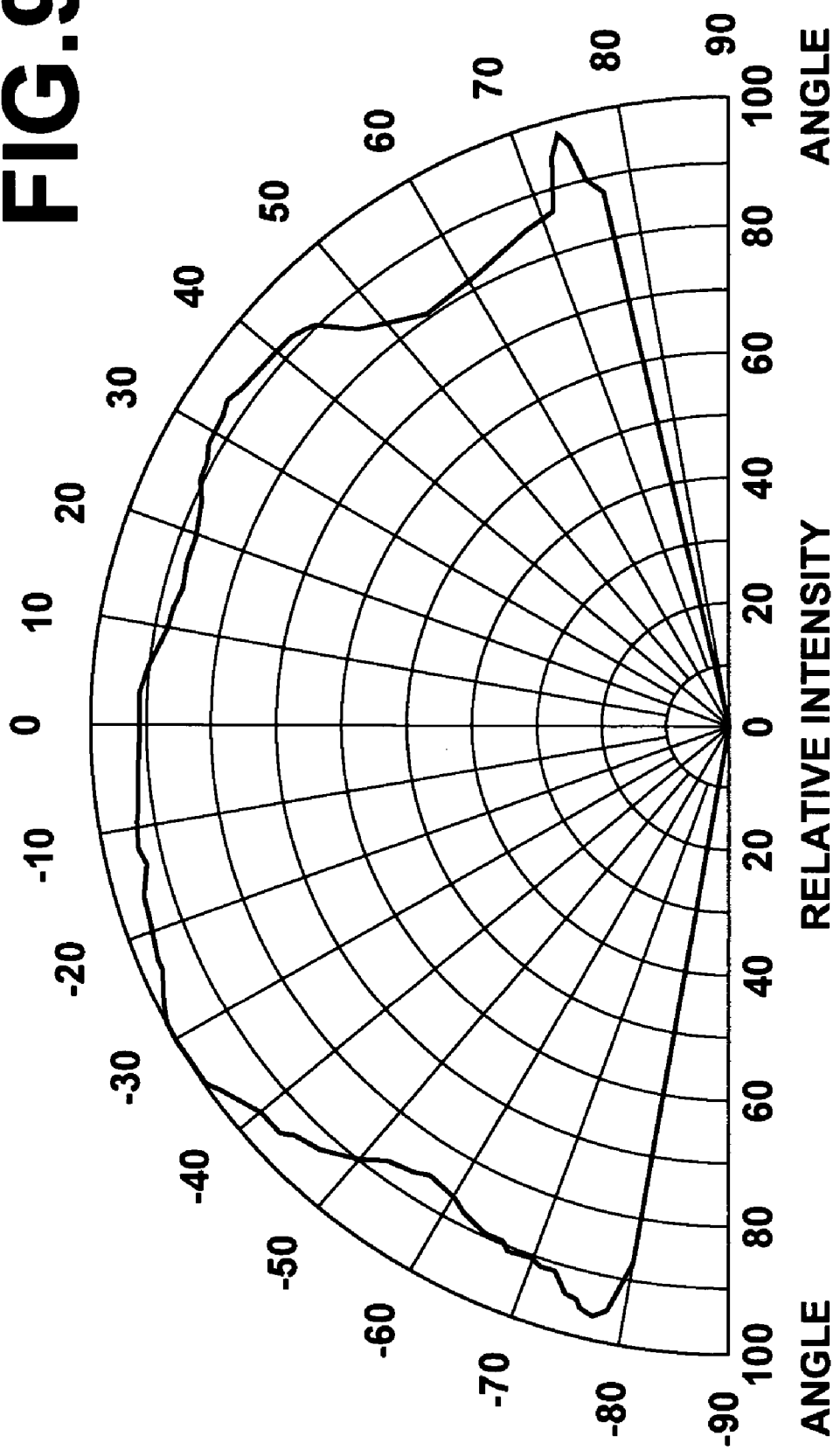

EXPOSURE SYSTEM AND HOLE ARRAY

BACKGROUND OF THE INVENTION

1. Field of the Invention

This invention relates to an exposure system for exposing an image recording medium to a recording light by scanning the image recording medium with the recording light to read the image recorded on the recording medium, and more particularly to such an exposure system having a hole array.

2. Description of the Related Art

There has been known an image reading system in which a photoconductive body such as a selenium plate sensitive to X-rays is employed as an electrostatic recording medium, the electrostatic recording medium is exposed to radiation such as X-rays carrying thereon radiation image information to store a latent image electric charge representing the radiation image, and then the radiation image information is read out by scanning the electrostatic recording medium with a laser beam and detecting the electric current generated in the electrostatic recording medium upon exposure to the laser beam through plane electrodes or stripe electrodes on opposite sides of the electrostatic recording medium. See, for instance, U.S. Pat. Nos. 4,176,275, 5,440,146 and 5,510,626 and "A Method of Electronic Readout of Electrophotographic and Electroradiographic Images"; Journal of Applied Photographic Engineering, Volume 4, Number 4, Fall 1978, pp. 178 to 182. By the use of the electrostatic recording medium, the irradiation dose to the patient can be reduced and at the same time, the diagnostic performance can be improved.

We, this applicant, have proposed an electrostatic recording medium comprising a first conductive layer permeable to recording radiation, a recording photoconductive layer which exhibits conductivity upon exposure to the recording radiation, a charge transfer layer which behaves like a substantially insulating material to an electric charge in the same polarity as that in which the first conductive layer is charged and behaves like a substantially conductive material to the electric charge in the polarity opposite to that in which the first conductive layer is charged, a reading photoconductive layer which exhibits conductivity upon exposure to reading light and a second conductive layer permeable to the reading light which are superposed one on another in this order, and an image reading system for reading out radiation image information from the electrostatic recording medium. See, for instance, U.S. Pat. No. 6,268,614.

In the image reading system disclosed in U.S. Pat. No. 6,268,614, reading light emitted from the light source is caused to scan the electrostatic recording medium when reading out an electrostatic latent image. As a reading light exposure system which exposes the electrostatic recording medium to the reading light, there has been known a spot beam exposure means which scans the electrostatic recording medium in both the main and sub-scanning directions with a spot beam such as of a laser beam or a line beam exposure means which scans the electrostatic recording medium in only one scanning direction with a line beam. As a light source for emitting a line beam, there has been known those comprising a plurality of linearly arranged light emitting elements.

A method in which an LED array comprising a plurality of LEDs arranged like an array is employed as one of light sources comprising a plurality of linearly arranged light emitting elements has been known. (See, for instance, U.S. Patent Laid-Open NO. 20010025936.) The LED is high in efficiency versus input energy and can keep lower the cost as compared with a laser or the like. When a line light source comprising a plurality of LEDs is employed, light beams emitted from the respective LEDs are collected in a direction perpendicular to the direction in which the LEDs are arranged (will be referred to as "scanning direction", hereinbelow) by an optical means such as a cylindrical lens disposed in parallel to the direction in which the LEDs are arranged (will be referred to as "LED arranging direction", hereinbelow) and are projected onto the electrostatic recording medium as a reading line beam. The line beam is caused to scan the electrostatic recording medium and image information is read out from the electrostatic recording medium.

However, in such a reading light exposure system, when the light beams emitted from the respective LEDs are collected in the scanning direction by an optical means, fluctuation in focusing point is generated since the angles of divergence of the light beams emitted from the respective LEDs are not limited in the LED arranging direction. Accordingly, focused light beams and defocused light beams are mingled with each other on the electrostatic recording medium and the defocused light beams increase flares and enlarge the line width.

Further, in such a reading light exposure system, there has been a problem that the line beam on the electrostatic recording medium is not uniform in its intensity in the LED arranging direction. That is, in the line beam on the electrostatic recording medium, the central portion where light beams emitted from a larger number of LEDs are collected is higher in intensity and the intensity is reduced toward the ends of the line beam where light beams emitted from a smaller number of LEDs are collected. Such nonuniformity in intensity can deteriorate reliability of the image information read out.

In order to overcome this problem, we, this applicant, have proposed in U.S. Patent Laid-Open No. 20040046134 a reading light exposure system comprising a line source having a number of linearly arranged light emitting elements, an optical means which collects reading light beams emitted from the light emitting elements in a direction perpendicular to the light emitting element arranging direction and a pinhole array which limits the angles of divergence of the light beams emitted from the respective light emitting elements in the light emitting element arranging direction.

An example of the reading light exposure system using a pinhole array will be described, hereinbelow, with reference to FIGS. 7A and 7B. FIG. 7A is a side view of the reading light exposure system 200 as viewed in the Y-direction (the scanning direction). The LED arranging direction will be referred to as "the Z-direction" and the direction perpendicular to the Y-Z plane will be referred to as "the X-direction", hereinbelow. FIG. 7B is a cross-sectional view taken along a plane parallel to the X-Y plane. The reading light exposure system 200 comprises a line source 101 formed by a plurality of linearly arranged surface emitting LED chips 101a, 101b, 101c . . . , a slit 102 having an opening extending in the longitudinal direction of the line source 101, a pinhole array 201 having circular pinholes 201a, 201b, 201c . . . (FIG. 8A) formed at the same intervals as the pitches at which the LED chips 101a, 101b, 101c . . . are arranged, and a pair of cylindrical lenses 104 and 105 which converge the reading light L in the Y-direction.

The slit 102 is a field stop which limits the light emitting images of the LED chips of the line source 101. The pinhole array 201 is of a predetermined thickness and limits the angles of divergence of light beams emitted from the LED chips 101a, 101b, 101c . . . to about 10° in all directions. The pinholes may be square in shape as shown in FIG. 8B.

The light emitting images of the LED chips 101a, 101b, 101c . . . are limited by the opening of the slit 102, are limited in the angles of divergence by the respective pinholes 201a, 201b, 201c . . . of the pinhole array 201, are collected in the Y-direction by the cylindrical lenses 104 and 105, and then projected onto the electrostatic recording medium 10.

Since the light distribution profile of the LED chip is very wide as shown in FIG. 9, a light beam emitted from one LED chip illuminates a very wide range unless the angle of divergence is limited in the Z-direction by the pinhole array 201. However, in the reading light exposure system 200, since the angle of divergence is narrowed in the Z-direction, the illuminating range of a light beam emitted from one LED chip is reduced to one several times to one several tens of times.

Accordingly, the number of LED chips corresponding to one illuminating spot at the central portion of the electrostatic recording medium 10 becomes smaller than the conventional. This means that a light intensity equivalent to the central portion of the electrostatic recording medium 10 can be obtained in the end portions of the electrostatic recording medium and the light intensity is reduced only in the extreme end portions of the electrostatic recording medium, whereby uniformity in the light intensity in the LED arranging direction is improved, and reliability of the image information read out can be increased.

Generally, when a reading light beam L which exits from one point and diverges in the Z-direction is converged by the cylindrical lenses 104 and 105, the reading light beam is converged on different points according to its exit angle. For example, when the electrostatic recording medium 10 is positioned on focus, the light beam is focused on the electrostatic recording medium 10 when the exit angle is 0, whereas focused on another position when the exit angle is not 0. Accordingly, focused light beams and defocused light beams are mingled with each other on the electrostatic recording medium 10, which generates flares in the linearly condensed reading light beam L and increases the line width (as measured in the Y-direction). As the angle of divergence of the reading light beam L in the Z-direction increases, flares in the linearly condensed reading light beam L becomes larger and the line width is increased. That is, in the reading light exposure system 200, flares in the reading light beam L linearly condensed on the electrostatic recording medium 10 is reduced and the line width is decreased by limiting divergence of the reading light beam L in the Z-direction, whereby reliability of the image information read out can be increased.

However, the reading light exposure system shown in FIGS. 7A and 7B gives rise to a problem that the efficiency of utilization of the reading light beam emitted from the line source is low since a pinhole array in which a number of circular or square pinholes are arranged is used. When the pinholes are increased in size, though the efficiency of utilization of the reading light beam emitted from the line source can be improved, the angle of divergence of the reading light beam in the longitudinal direction of the line source increases, which results in deterioration in uniformity of the light intensity in the longitudinal direction of the line source and increase in fluctuation of the focusing points to increase the flares, thereby deteriorating the reliability of the image information read out.

Further, the pinhole array is generally not smaller than 1 mm in thickness. When the pinhole array is several hundreds of μm in thickness, the pinhole array can be inexpensively formed by a known chemical etching technology or a known ion etching technology. However, it is difficult to form a pinhole array not smaller than 1 mm in thickness and pinhole arrays not smaller than 1 mm in thickness are generally formed by wire-cutting using electric discharge. Accordingly, the pinhole array is expensive, which naturally makes the reading light exposure system expensive.

SUMMARY OF THE INVENTION

In view of the foregoing observations and description, the primary object of the present invention is to provide an exposure system in which the efficiency of utilization of the reading light beam emitted from the line source can be increased without deteriorating the reliability of the image information read out.

Another object of the present invention is to inexpensively provide such an exposure system.

Still another object of the present invention is to provide an inexpensive hole array.

In accordance with a first aspect of the present invention, there is provided a reading light exposure system, which scans an image recording medium with a reading light beam, comprising a line source emitting the reading light beam, an optical means which converges the reading light beam emitted from the line source in a direction perpendicular to the longitudinal direction of the line source, and a pinhole array having a number of pinholes which limit the angle of divergence of the reading light beam in the longitudinal direction of the line source with respect to the optical axis of the optical means, wherein the improvement comprises that the length of each of the pinholes in the direction perpendicular to the longitudinal direction of the line source is larger than the length thereof in the longitudinal direction of the line source.

Preferably the length of each of the pinholes in the direction perpendicular to the longitudinal direction of the line source is larger than 1.5 times the length thereof in the longitudinal direction of the line source. More preferably, the length of each of the pinholes in the direction perpendicular to the longitudinal direction of the line source is larger than 2.0 times the length thereof in the longitudinal direction of the line source.

The "pinhole" need not define a vacant space but may define any optical opening so long as it can limit the angle of divergence of the reading light beam in the longitudinal direction of the line source with respect to the optical axis of the optical means. For example, the pinhole array may be a density profile filter array formed by a plurality of density profile filters.

The line source may comprise either a number of linearly arranged LEDs or a single or a plurality of organic or inorganic EL.

The image recording medium may be, for instance, an electrostatic recording medium which generates an electric current according to an electrostatic latent image recorded thereon when exposed to reading light or a stimulable phosphor sheet which emits instantaneous light according to the image information stored thereon when exposed to reading light.

The "reading light beam" need not be limited to a light beam including an infrared light beam, a visible light beam or an ultraviolet light beam but may be of any electromagnetic wave of any wavelength so long as it can be employed to read out the image information from the image recording medium. For example, when the image recording medium is an electrostatic recording medium, the reading light beam may be of any wavelength so long-as it can be employed to read out the electrostatic latent image, whereas when the image recording medium is a stimulable phosphor sheet, the reading light beam may be of any wavelength so long as it can excite the stimulable phosphor sheet to emit the instantaneous light.

In the reading light exposure system of the first aspect of the present invention, by virtue of the pinhole array having a number of pinholes which limit the angles of divergence of the reading light beams in the longitudinal direction of the line source and are longer in the length in the direction perpendicular to the longitudinal direction of the line source than the length in the longitudinal direction of the line source, the efficiency of utilization of the reading light beam emitted from the line source can be increased without increasing the angle of divergence of the reading light, that is, without deteriorating the reliability of the image information read out.

In accordance with a second aspect of the present invention, there is provided a hole array having a number of through holes comprising a plurality of hole array plates bonded together, each having openings formed in positions corresponding to the through holes.

At least one of the hole array plates may have at least one opening which is larger in shape than the through hole. "The shape of the through hole" means a cross-sectional shape of a part which linearly extends through the hole array in the direction of use of the hole array.

Further, at least one of the hole array plates may have at least one opening which is formed in positions corresponding to a plurality of the through holes and is shaped to include the through holes.

Further, at least one of the outermost hole array plates may have openings which are formed in positions each corresponding to each of the through holes and in shapes substantially the same as the corresponding through holes.

In the case where the hole array comprises at least three hole array plates, the two outermost hole array plates may have openings which are formed in positions each corresponding to each of the through holes and in shapes substantially the same as the corresponding through holes.

In accordance with a third aspect of the present invention, there is provided a light exposure system, comprising a line source emitting a light beam, an optical means which converges the light beam emitted from the line source in a direction perpendicular to the longitudinal direction of the line source, and a hole array having a number of holes which limit the angles of divergence of the light beams in the longitudinal direction of the line source with respect to the optical axis of the optical means, wherein the improvement comprises that the hole array is formed by a plurality of hole array plates bonded together, each having openings formed in positions corresponding to the through holes.

At least one of the hole array plates may have at least one opening which is larger in shape than the through hole.

Further, at least one of the hole array plates may have at least one opening which is formed in positions corresponding to a plurality of the through holes and is shaped to include the through holes.

Further, one of the two outermost hole array plates remoter from the line source may have openings which are formed in positions each corresponding to each of the through holes and in shapes substantially the same as the corresponding through holes.

In the case where the hole array comprises at least three hole array plates, the two outermost hole array plates may have openings which are formed in positions each corresponding to each of the through holes and in shapes substantially the same as the corresponding through holes.

"The outermost hole array plate" means a hole array plate which is opposed to another hole array plate at its one side but is not opposed to another hole array plate at its the other side. That is, one hole array has a pair of "outermost hole array plates".

Since comprising a plurality of hole array plates bonded together, each having openings formed in positions corresponding to the through holes, the hole array of the second aspect of the present invention can be inexpensively formed by a known chemical etching technology or the like. A light exposure system using such a hole array can be inexpensive.

When at least one of the hole array plates has at least one opening which is larger in shape than the through hole, the hole array can be smaller in weight.

Generally, the exposure system is mechanically caused to scan the material to be exposed. Accordingly, the exposure system requires a non-scanning area for starting and stopping the same in addition to the scanning area for moving the same to scan the material to be exposed, and the non-scanning area has been an obstacle to miniaturization of the exposure system. By the use of the light-weighted hole array, the exposure system can be light-weighted and the non-scanning area can be narrowed, whereby the exposure system can be miniaturized.

Further, when at least one of the hole array plates has at least one opening which is formed in positions corresponding to a plurality of the through holes and is shaped to include the through holes, the hole array can be smaller in weight, and at the same time, since the number of the openings is reduced, production of the hole array plates is facilitated. The exposure system using such a hole array can be smaller in weight and at the same time, is easy to produce.

Further, when at least one of the outermost hole array plates has openings which are formed in positions each corresponding to each of the through holes and in shapes substantially the same as the corresponding through holes, the hole array can be smaller in weight without loosing the function as a hole array.

Further when, one of the two outermost hole array plates remoter from the line source has openings which are formed in positions each corresponding to each of the through holes in shapes substantially the same as the corresponding through holes, the hole array can be smaller in weight while limiting the angle of divergence of the light beam.

In the case where the hole array comprises at least three hole array plates, when the two outermost hole array plates have openings which are formed in positions each corresponding to each of the through holes and in shapes substantially the same as the corresponding through holes, the hole array can be smaller in weight while keeping excellent the function as a hole array.

When the hole array described above is used for limiting the angle of divergence of the light beam, the exposure system can be smaller in weight while keeping excellent the function of limiting the angle of divergence of the light beam.

BRIEF DESCRIPTION OF THE DRAWINGS

FIG. 7A is a side view of the conventional reading light exposure system as viewed in the Y-direction, FIG. 7B is a cross-sectional view of the same taken along a plane parallel to the X-Y plane, FIG. 9 is a view showing the light distribution profile of the LED chip.

DESCRIPTION OF THE PREFERRED EMBODIMENTS

Figure 1A:
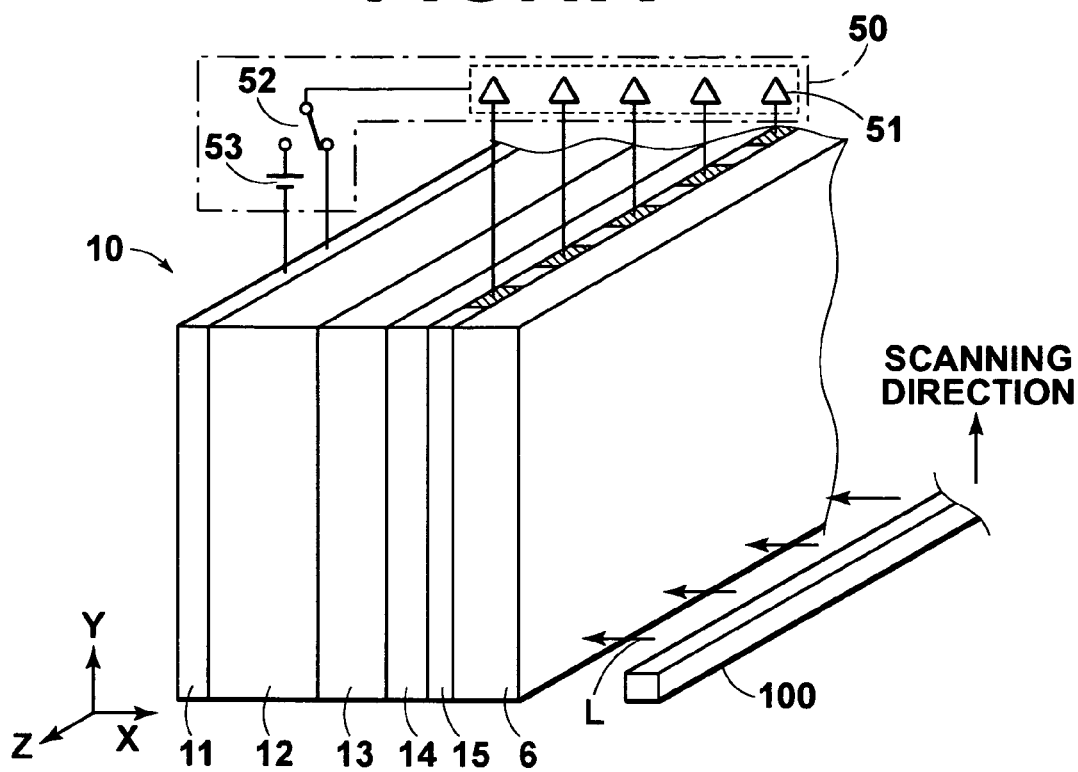
FIG. 1A is a perspective view showing a radiation image read-out system employing a reading light exposure system in accordance with a first embodiment of the present invention.
Figure 1B:
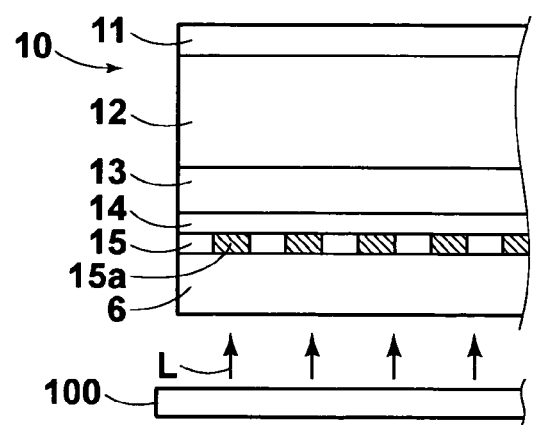
FIG. 1B is a cross-sectional view of the same taken along a plane parallel to the X-Z plane.

In FIGS. 1A and 1B, a radiation image read-out system employing a reading light exposure system 100 in accordance with a first embodiment of the present invention comprises an electrostatic recording medium 10 formed on a glass substrate 6, a reading light exposure system 100 in accordance with a first embodiment of the present invention which projects a reading light beam L onto the electrostatic recording medium 10 upon reading out an image therefrom and a current detecting means 50 which detects the electric current which flows out from the electrostatic recording medium 10 upon exposure to the reading light beam L.

The electrostatic recording medium 10 is for storing radiation image information as an electrostatic latent image and outputs an electric current according to the electrostatic latent image when scanned with a reading light beam, and comprises a first conductive layer 11 permeable to recording radiation (e.g., X-rays; will be referred to as "the recording light", hereinbelow.), a recording photoconductive layer 12 which exhibits conductivity upon exposure to the recording light, a charge transfer layer 13 which behaves like a substantially insulating material to an electric charge in the same polarity as that in which the first conductive layer 11 is charged (the latent image polarity charge; e.g., the negative charge) and behaves like a substantially conductive material to the electric charge in the polarity opposite to the latent image polarity charge (the transfer polarity charge; e.g., the positive charge), a reading photoconductive layer 14 which exhibits conductivity upon exposure to reading light and a second conductive layer 15 permeable to the reading light which are superposed one on another in this order. The second conductive layer 15 is in the form of a stripe electrode comprising a number of elements (linear electrodes) 15a disposed like stripes at pitches of pixels.

The current detecting means 50 comprises a number of electric current detecting amplifiers 51, each of which is connected to one of the elements 15a, and detects the electric currents flowing through the respective elements 15a upon exposure to the reading light. The first conductive layer 11 of the electrostatic recording medium 10 is connected to one of inputs of a changeover means 52 and the negative pole of a power source 53, and the positive pole of the power source 53 is connected the other of inputs of the changeover means 52. The changeover means 52 has one output which is connected to each of the electric current detecting amplifiers 51. Since having no relation with the present invention, the detailed structure of the electric current detecting amplifiers 51 will not be described here but the electric current detecting amplifiers 51 may be of various known structures. It is needless to say that connection of the changeover means 52 and the power source 52 can differ depending on the structure of the electric current detecting amplifiers 51.

Operation of the radiation image read-out system will be described, hereinbelow. When an electrostatic latent image is to be recorded on the electrostatic recording medium 10, the changeover means 52 is first switched to the power source 53 and a DC voltage is applied between the first conductive layer 11 and the respective elements 15a of the second conductive layer 15 to charge the conductive layers. By this, U-shaped electric fields are established between the first conductive layers 11 and the respective elements 15a with the respective elements 15a positioned at the bottoms of the Us.

Then the electrostatic recording medium 10 is exposed to recording light which passes through an object (not shown) and accordingly carries radiation image information of the object. This generates charged pairs in the recording photoconductive layer 12. The negative charges of the charged pairs are collected to the elements 15a along the electric fields described above and negative charges are stored on the interface between the recording photoconductive layer 12 and the charge transfer layer 13. Since, the amount of the negative charges (latent image charges) is approximately proportional to the amount of the radiation to which the electrostatic recording medium 10 is exposed, the stored latent image charges carry the electrostatic latent image. The positive charges generated in the recording photoconductive layer 12 are attracted against the first conductive layer 11 and combine with negative charges injected from the power source 53 to cancel each other.

When the electrostatic latent image is to be read out from the electrostatic recording medium 10, the changeover means 52 is first switched to the first conductive layer 11 of the electrostatic recording medium 10.

When a line reading light L emitted from the exposure system 100 impinges upon the reading photoconductive layer 14 through the glass substrate 6 and the elements 15a of the second conductive layer 15, charged pairs are generated in the reading photoconductive layer 14. The positive holes of the charged pairs rapidly move through the charge transfer layer 13 attracted by the negative charges (the latent image charges) stored on the interface between the recording photoconductive layer 12 and the charge transfer layer 13 and combine with the negative charges to cancel each other. Whereas, the negative charges generated in the reading photoconductive layer 14 are cancelled by positive charges injected by the power source 53 to the second conductive layer 15. The negative charges stored in the electrostatic recording medium 10 are cancelled in this manner by recombination of electric charges. Movement of the electric charges upon recombination of electric charges generates an electric current in the electrostatic recording medium 10 and the electric current is detected by the element 15a through the current detecting amplifier 51 connected to each element 15a. Since the electric current flowing through the electrostatic recording medium 10 is proportional to the latent image charges, that is, corresponds to the electrostatic latent image, the electrostatic latent image can be read out by detecting the electric current. The exposure system 100 is moved in the scanning direction to cause the line reading light beam L to scan the electrostatic recording medium 10 so that the entire area of the electrostatic recording medium 10 is exposed to the reading light beam L.

Figure 2B:
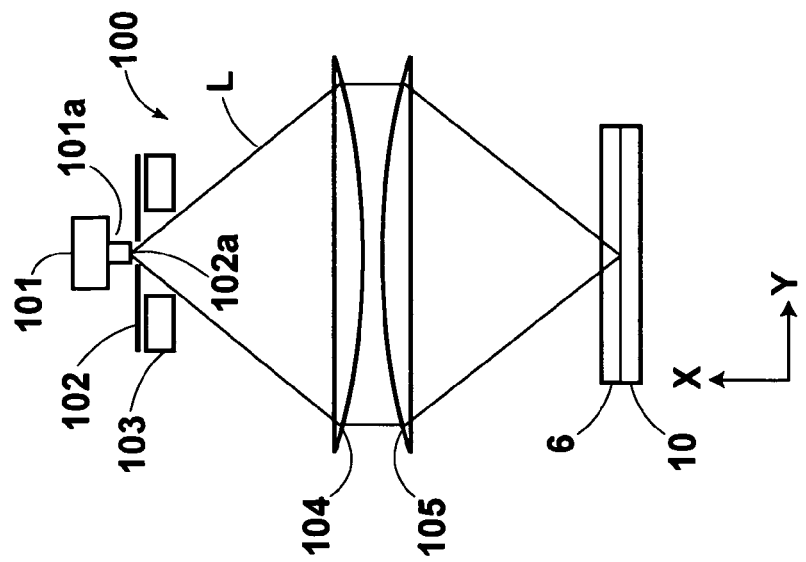
FIG. 2B is a cross-sectional view of the same taken along a plane parallel to the X-Y plane.
Figure 2A:
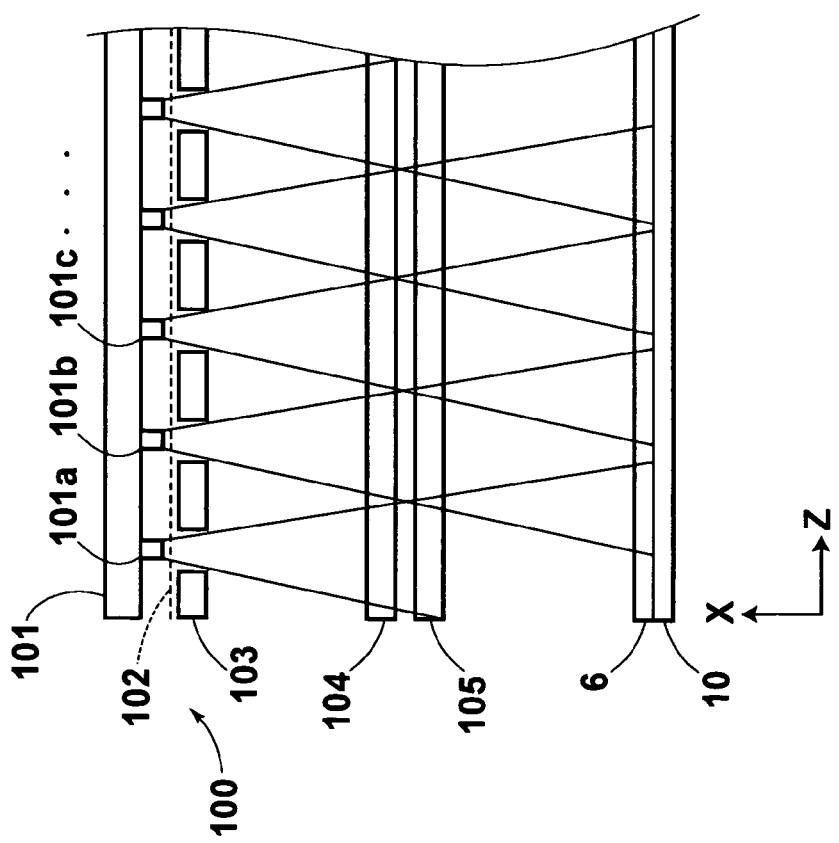
FIG. 2A is a side view of the reading light exposure system as viewed in the Y-direction.

The reading light exposure system 100 in accordance with a first embodiment of the present invention employed in the radiation image read-out system will be described with reference to FIG. 2A and 2B, hereinbelow. FIG. 2A is a side view of the reading light exposure system 100 as viewed in the Y-direction (a direction perpendicular to the LED arranging direction), and FIG. 2B is a cross-sectional view of the same taken along a plane parallel to the X-Y plane. The X-direction is a direction of travel of the reading light beam L and the Z-direction is the LED arranging direction (the direction in which the LED chips are arranged).

As shown in FIGS. 2A and 2B, the reading light exposure system 100 of this embodiment comprises a line source 101 formed by a plurality of LED chips 101a, 101b, 101c . . . linearly arranged in the Z-direction, a slit 102 having an opening extending in the Z-direction (e.g., at intervals of 1 mm), a pinhole array 103 having pinholes formed at the same intervals as the pitches at which the LED chips 101a, 101b, 101c . . . are arranged, and a pair of cylindrical lenses 104 and 105 which converge the reading light L in the Y-direction.

The slit 102 is a field stop which limits the light emitting images of the LED chips of the line source 101. The slit 102 need not be a mechanical slit having an opening as in this embodiment but may be, for instance, a density profile filter having an optical opening so long as it can limit the light emitting area of the LED chips 101a, 101b, 101c . . . .

Figure 3A:
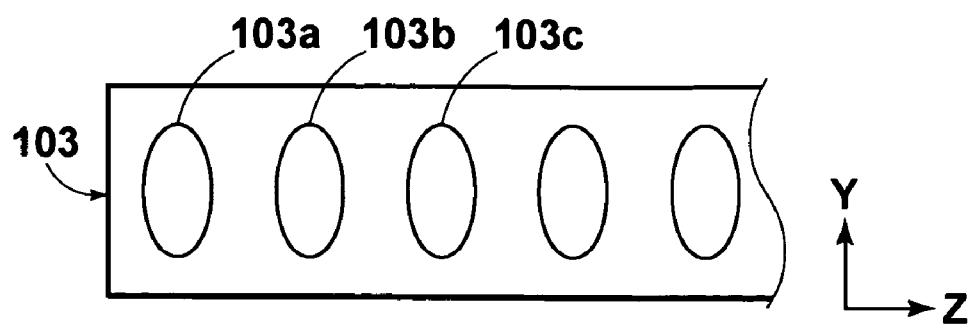
FIGS. 3A and 3B are plan views showing examples of the pinhole array.
Figure 3B:
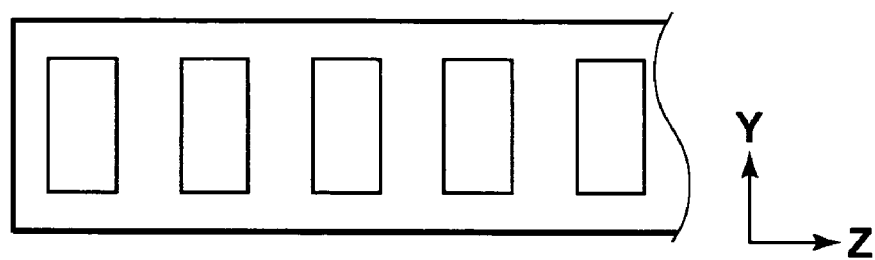

As shown in FIG. 3A, the pinhole array 103 has ellipsoidal pinholes 103a, 103b, 103c . . . formed at the same intervals as the pitches at which the LED chips 101a, 101b, 101c . . . are arranged. The length of each of the pinholes 103a, 103b, 103c . . . in the Y-direction is about 2.0 times the length thereof in the Z-direction. The pinhole array 103 is of a predetermined thickness and limits the angles of divergence of light beams emitted from the LED chips 101a, 101b, 101c . . . to about 20° in the Y-direction and about 10° in the Z-direction. The pinhole array 103 is antireflection-processed to prevent reflection of light therein. The pinholes 103a, 103b, 103c . . . may be rectangular in shape as shown in FIG. 3B. Further, the pinhole array 103 may be those having optical openings formed by density filters or the like.

The light emitting images of the LED chips 101a, 101b, 101c . . . are limited by the opening 102a of the slit 102, and the reading light beam L emitted from the LED chips 101a, 101b, 101c . . . is limited in the angle of divergence to about 20° in the Y-direction and about 10° in the Z-direction by the respective pinholes 103a, 103b, 103c . . . of the pinhole array 103, is collected in the Y-direction by the cylindrical lenses 104 and 105, and then is projected onto the electrostatic recording medium 10. It is preferred that when the angles of divergence in the Y-direction of the reading light beams L emitted from the LED chips 101a, 101b, 101c . . . is wide, aspheric lenses corrected with spherical aberration be used as the cylindrical lenses 104 and 105.

As can be understood from the description above, in the reading light exposure system 100 of this embodiment, since the pinholes 103a, 103b, 103c . . . of the pinhole array 103 are about 2.0 times the length thereof in the Z-direction in the length thereof in the Y-direction, the angles of divergence in the Y-direction of the reading light beams L emitted from the LED chips 101a, 101b, 101c . . . is wider as compared with the conventional reading light exposure system where a pinhole array whose pinholes are square (the same in the lengths in the Z-direction and in the Y-direction) and the efficiency of utilization of the reading light beam L emitted from the LED chips 101a, 101b, 101c . . . is improved. Further, since the angles of divergence in the Z-direction of the reading light beams L emitted from the LED chips 101a, 101b, 101c . . . are the same as in the conventional reading light exposure system, uniformity of the intensity of the reading light beam in the LED arranging direction does not deteriorate and increase in flares due to increase in fluctuation of the focusing points is not involved. That is, the efficiency of utilization of the reading light beam emitted from the light emitting element can be increased without deteriorating the reliability of the image information read out.

Figure 4B:
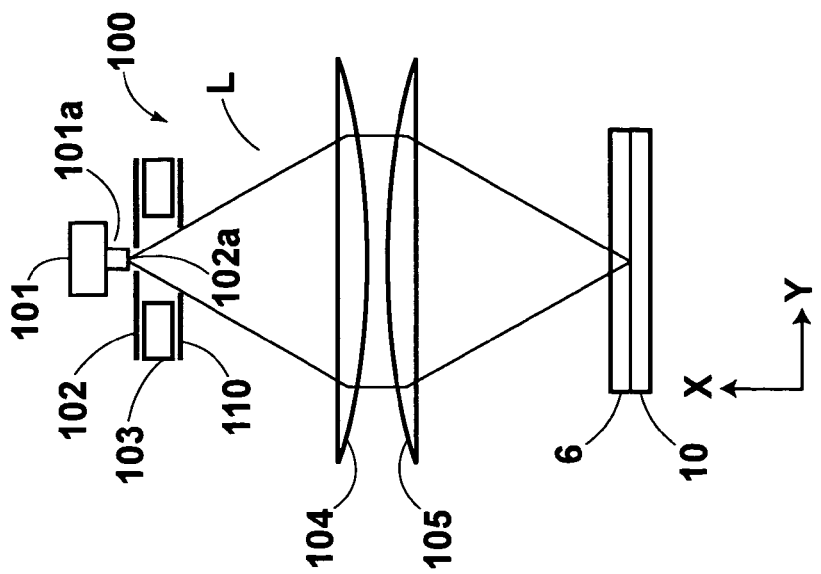
FIG. 4B is a cross-sectional view similar to FIG. 2B but showing the same.
Figure 4A:
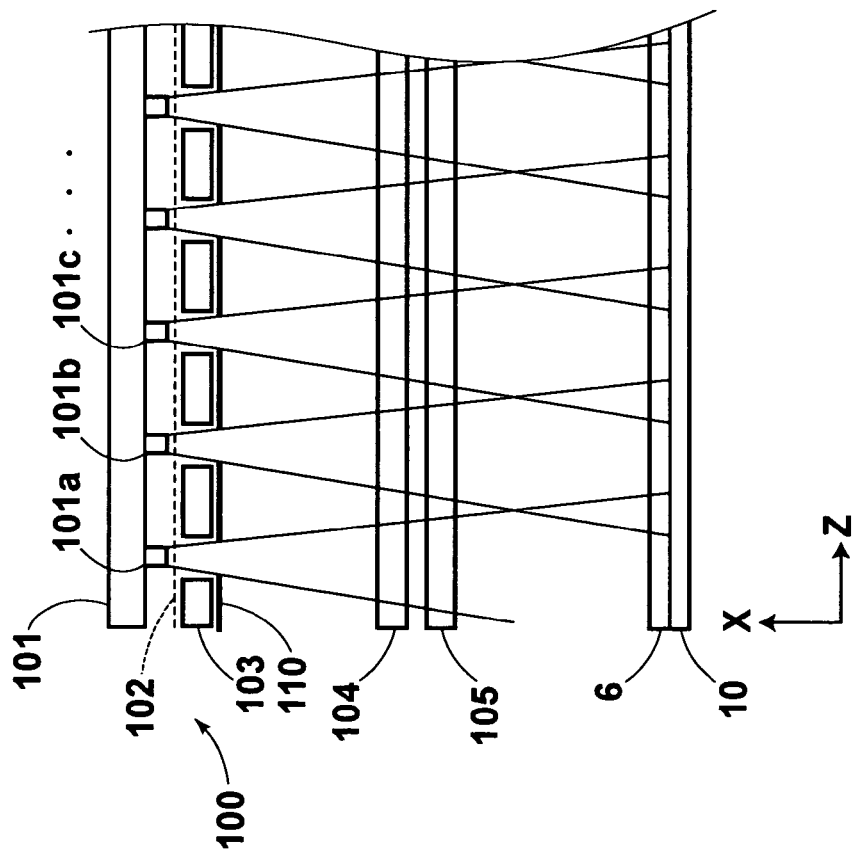
FIG. 4A is a side view similar to FIG. 2A but showing a reading light exposure system in accordance with a modification of the reading light exposure system shown in FIGS. 2A and 2B.

As shown in FIGS. 4A and 4B, a second pinhole array 110 whose pinholes are smaller than the size of the pinholes 103a, 103b, 103c . . . of the first pinhole array 103 may be provided in addition to the first pinhole array 103. With this arrangement, reflected light in the pinholes of the pinhole array 103 can be surely cut and generation of flares can be prevented. When the second pinhole array 110 is smaller in thickness than the first pinhole array 103, e.g., when the thickness of the second pinhole array 110 is 0.05 mm with the thickness of the first pinhole array 103 being 2 mm, reflection of light in the pinholes of the second pinhole array 110 can be suppressed and generation of flares can be better prevented. In the case where the efficiency of utilization of the reading light beam is sufficient, generation of flares can be further better prevented by reducing the size of the pinholes of the second pinhole array 110.

Though in the radiation image read-out system described above, the reading light exposure system in accordance with the present invention is employed to expose an electrostatic recording medium 10 having a stripe electrode, the reading light exposure system in accordance with the present invention may be employed to expose any image recording medium so long as it generates an electric current according to the radiation image carried thereby upon exposure to reading electromagnetic waves.

Figure 5:
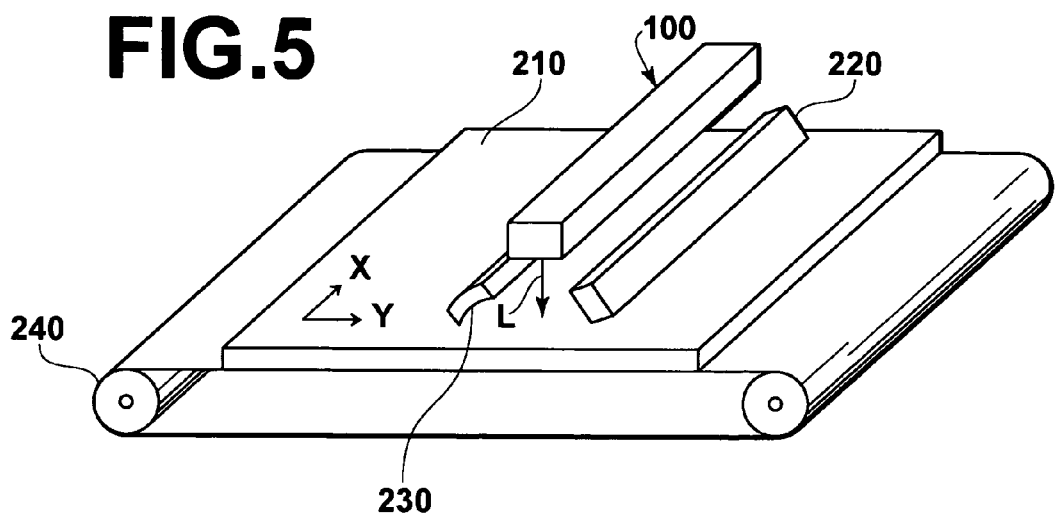
FIG. 5 is a perspective view showing an image read-out system employing a reading light exposure system of the present invention.
Figure 6:
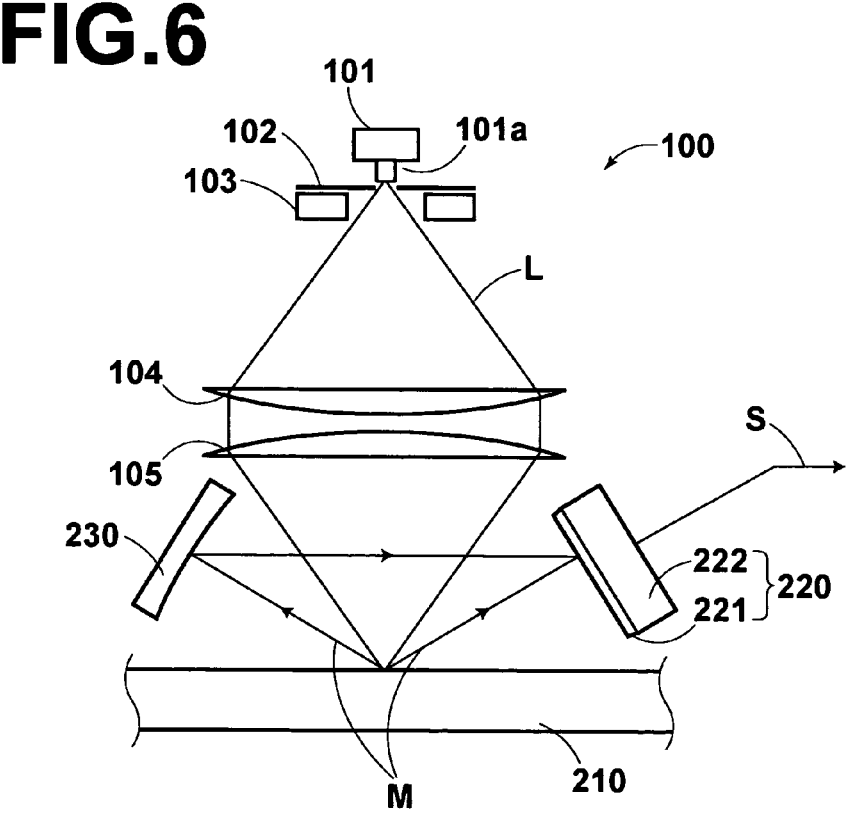
FIG. 6 is cross-sectional view showing in an enlarged scale a detailed structure of the reading light exposure system and the system for detecting the instantaneous light M of the image read-out system shown in FIG. 5.
Figure 8A:
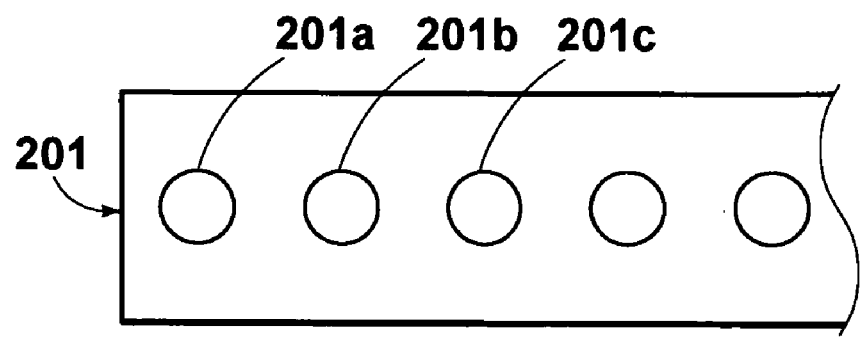
FIGS. 8A and 8B are plan views showing examples of the pinhole array of the present invention.
Figure 8B:
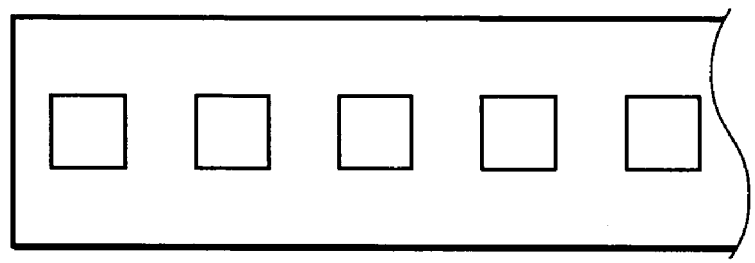

Another radiation image read-out system employing the reading light exposure system 100 in accordance with a first embodiment of the present invention will be described with reference to FIGS. 5 and 6, hereinbelow. FIG. 5 shows an image read-out system employing the reading light exposure system 100 for reading out an image from a stimulable phosphor sheet, and FIG. 6 is cross-sectional view showing in an enlarged scale a detailed structure of the reading light exposure system and the system for detecting the instantaneous light M of the image read-out system shown in FIG. 5.

The image read-out system comprises the reading light exposure system 100 which projects a reading light beam (a stimulating light beam) L to a stimulable phosphor sheet 210, a photodetector 220 which extends in the direction of arrow X and detects the instantaneous light M emitted from the stimulable phosphor sheet 210 upon exposure to the reading light L, a reading light cut filter 221 which is disposed to cover the light inlet end face of the photodetector 220 so that the reading light beam L does not impinge upon the photodetector 220, a light collecting mirror 230 which extends in the direction of arrow X to efficiently lead the instantaneous light M to the light inlet end face of the photodetector 220, a sheet conveyor means 240 in the form of a belt conveyor which conveys the stimulable phosphor sheet 210 in the direction of arrow Y, and a signal processing system (not shown) connected to the photodetector 220. The photodetector 220 comprises a plurality of photoelectric converter elements 222 which are arranged in the longitudinal direction thereof (the direction of arrow X) and each of the photoelectric converter elements 222 detects the instantaneous light M emitted from a corresponding pixel on the stimulable phosphor sheet 210. The photoelectric converter element 222 may be, for instance, an amorphous silicon sensor, a CCD sensor or a MOS sensor.

Operation of the image read-out system will be described hereinbelow. A line reading light beam L emitted from the reading light exposure system 100 is projected onto the stimulable phosphor sheet 210 while the sheet conveyor means 240 conveys the stimulable phosphor sheet 210 in the direction of arrow Y, whereby almost the entire surface of the stimulable phosphor sheet 210 is exposed to the reading light beam L.

Instantaneous light M is emitted from the part of the stimulable phosphor sheet 210 exposed to the reading light L in an amount according to the radiation image information stored therein. The instantaneous light M disperses in all the directions and a part thereof directly impinges upon the light inlet end face of the photodetector 220 and apart thereof impinges upon the light inlet end face of the photodetector 220 after reflected by the light collecting mirror 230. At this time, the part of the recording light beam L which is reflected by the surface of the stimulable phosphor sheet 210 and travels toward the photodetector 220 together with the part of the instantaneous light M is cut by the reading light cut filter 221. The part of the instantaneous light M collected to the photodetector 220 is amplified and photoelectrically converted by the corresponding photoelectric converter element 222 and is output to an external signal processing system as an image signal component making up an image signal S.

Each of the LED chips of the reading light exposure system 100 outputs light of a wavelength suitable for causing the stimulable phosphor sheet 210 to emit the instantaneous light M.

Though, in the pinhole array 103, ellipsoidal pinholes 103a, 103b, 103c . . . are formed at the same intervals as the pitches at which the LED chips 101a, 101b, 101c . . . are arranged, the pinholes need not be formed at the same intervals as the pitches at which the LED chips 101a, 101b, 101c . . . are arranged so long as the pinhole array can limit the angle of divergence in the Z-direction of the reading light beam L. For example, a pinhole array in which pinholes of a double size of the pinholes 103a, 103b, 103c . . . are formed at the intervals double the pitches at which the LED chips 101a, 101b, 101c . . . are arranged may be used.

Further, the line source need not be formed by a plurality of linearly arranged LED chips but the line source may comprise, for instance, a single linear inorganic or organic EL. In this case, the pinholes may be formed at desired pitches.

Figure 10:
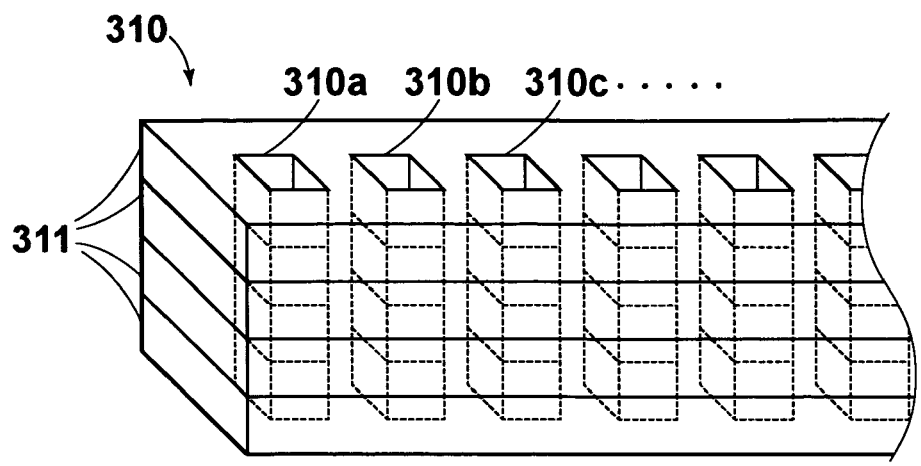
FIG. 10 is a perspective view showing a pinhole array employed in a reading light exposure system in accordance with a second embodiment of the present invention.
Figure 11:
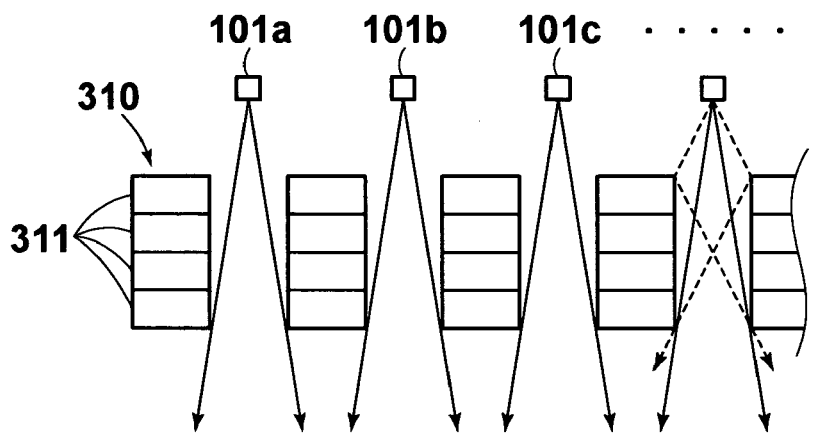
FIG. 11 is a cross-sectional view of the same.

A pinhole array 310 in accordance with a second embodiment of the present invention will be described with reference to FIGS. 10 to 12, hereinbelow. The pinhole array 310 of this embodiment is 1.5 mm, 200 mm and 1 mm respectively in Y-, Z- and X-directions. Pinholes 310a, 310b, 310c . . . are 500 μm squares and are formed at intervals of 1 mm, the same intervals as the pitches at which the LED chips 101a, 101b, 101c . . . are arranged. As shown in FIG. 11, the pinhole array 310 limits the angles of divergence of the light beams emitted from the LED chips 101a, 101b, 101c . . .

Figure 12:
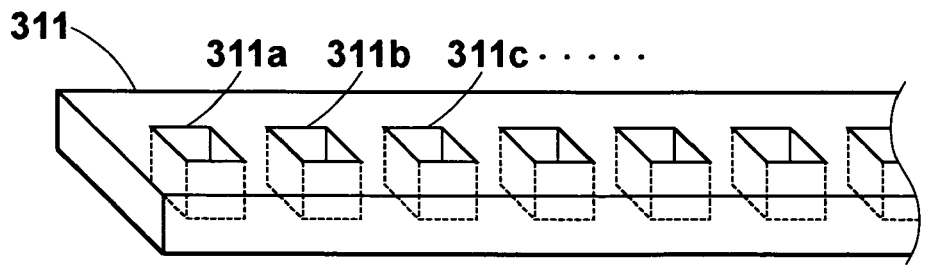
FIG. 12 is a perspective view showing an array plate employed in the pinhole array in the reading light exposure system.

The pinhole array 310 is formed by superposing and bonding as shown in FIG. 11 one on another four array plates 311 each of which is about 250 μm in thickness and is provided with openings 311a, 311b, 311c . . . which are 500 μm squares and are formed at intervals of 1 mm, the same intervals as the pitches at which the LED chips 101a, 101b, 101c . . . are arranged as shown in FIG. 12. Each of the array plates 311 is a plate of SUS, aluminum, or the like formed with the openings by chemical etching and is antireflection-processed.

As can be understood from the description above, the pinhole array 310 of this embodiment is produced by bonding four array plates 311 which are formed by chemical etching and accordingly, can be inexpensively produced.

A modification of the pinhole array will be described with reference to FIGS. 13 and 14, hereinbelow.

Figure 13:
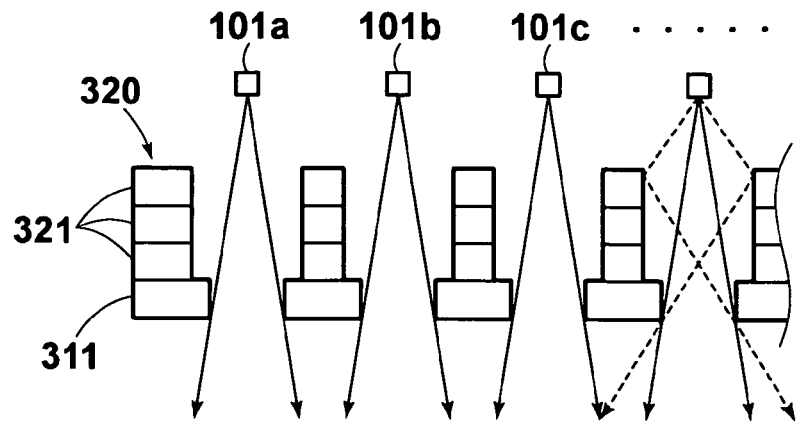
FIG. 13 is a cross-sectional view similar to FIG. 11 but showing a modification of the pinhole array shown in FIG. 11.
Figure 14:
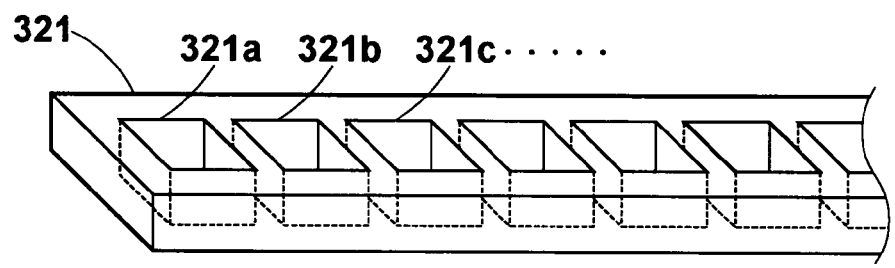
FIG. 14 is a perspective view similar to FIG. 12 but showing an array plate employed in the pinhole array of the modification.

In FIG. 13, a pinhole array 320 is formed by superposing and bonding three array plates 321 each of which is as shown in FIG. 14 on the array plate 311 which is as shown in FIG. 12. Each of the array plates 321 is 1.5 mm, 200 mm and 250 μm respectively in Y-, Z- and X-directions and is provided with openings 321a, 321b, 321c . . . which are 750 μm squares and are formed at intervals of 1 mm. The array plate 321 is a plate of SUS, aluminum, or the like formed with the openings by chemical etching and is antireflection-processed as the array plates 311.

The pinhole array 320 is positioned so that the array plates 321 are nearer to the LED chips 101a, 101b, 101c . . . than the array plate 311 and limits angles of divergence of the light beams emitted from the LED chips 101a, 101b, 101c . . . in the same manner as the pinhole array 310. Since the array plates 311 and 321 are formed by chemical etching, the pinhole array 320 can be inexpensively produced as the pinhole array 310. Further, since the openings occupies a larger area in the array plates 321 than in the array plate 311, the pinhole array 320 can be lighter in weight than the pinhole array 310. Generally, the reading light exposure system 100 is mechanically caused to scan the electrostatic recording medium 10. Accordingly, the reading light exposure system 100 requires a non-scanning area for starting and stopping the same in addition to the scanning area for moving the same to scan the electrostatic recording medium 10, and the non-scanning area has been an obstacle to miniaturization of the radiation image read-out system. By the use of the light-weighted pinhole array, the reading light exposure system 100 can be light-weighted and the non-scanning area can be narrowed, whereby the radiation image read-out system can be miniaturized.

Another modification of the pinhole array will be described with reference to FIGS. 15, 16A and 16B, hereinbelow.

The pinhole array 330 is about 1 mm in thickness and comprises an array plate 331, an array plate 332, another array plate 331 and an array plate 311 superposed and bonded together in this order from the side facing the LED chips 101a, 101b, 101c . . . .

Figure 16A:
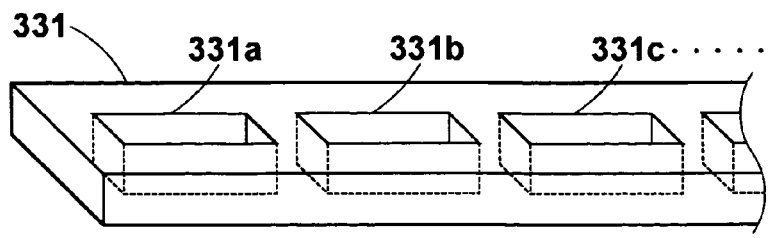
FIG. 16A is a perspective view similar to FIG. 14 but showing an array plate employed in the pinhole array shown in FIG. 15.

As shown in FIG. 16A, each of the array plates 331 is 1.5 mm, 200 mm and 250 μm respectively in Y-, Z- and X-directions and is provided with openings 331a, 331b, 331c . . . which are rectangles of 500 μm×1.5 mm elongated in Z-direction and are formed at intervals of 2 mm. As shown in FIG. 16B, the array plates 332 is 1.5 mm, 200 mm and 250 μm respectively in Y-, Z- and X-directions and is provided with a cutaway portion 332a which is a rectangle of 500 μm×1.0 mm elongated in Z-direction and opens in a side surface of the array plate 332a and with openings 332b, 332c . . . which are rectangles of 500 μm×1.5 mm elongated in Z-direction and are formed at intervals of 2 mm. Each of the array plates 331 and 332 is a plate of SUS, aluminum, or the like formed with the openings by chemical etching and is antireflection-processed as the array plates 311.

The pinhole array 330 is positioned so that the array plates 331 are nearer to the LED chips 101a, 101b, 101c . . . than the array plate 311 and limits angles of divergence of the light beams emitted from the LED chips 101a, 101b, 101c . . . in the same manner as the pinhole array 310. Since the array plates 311, 331 and 332 are formed by chemical etching, the pinhole array 330 can be inexpensively produced as the pinhole array 310. Further, since the openings occupies a larger area in the array plates 331 and 332 than in the array plate 311, the pinhole array 330 can be lighter in weight than the pinhole array 310. Further, since the number of the openings is smaller in the array plates 331 and 332 than in the array plate 311, production of the array plates 331 and 332 is facilitated.

Figure 15:
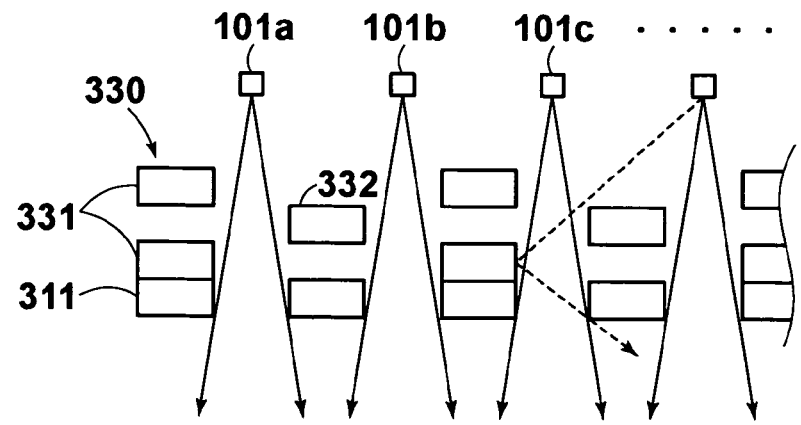
FIG. 15 is a cross-sectional view similar to FIG. 13 but showing another modification of the pinhole array.
Figure 16B:
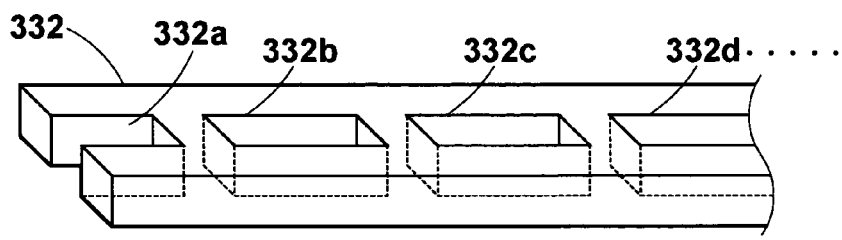
FIG. 16B is a perspective view similar to FIG. 14 but showing another array plate employed in the pinhole array shown in FIG. 15.
Figure 17:
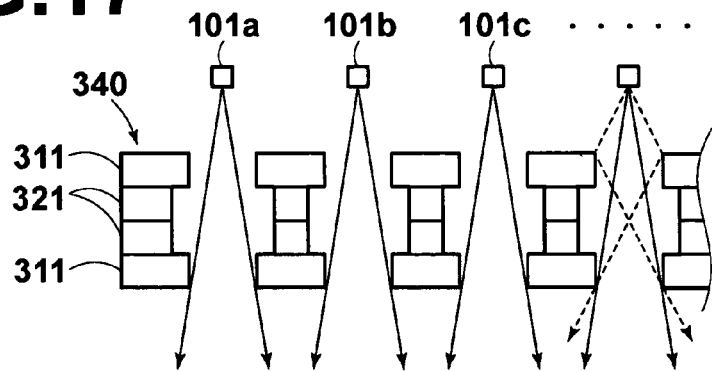
FIG. 17 is a cross-sectional view similar to FIG. 13 but showing still another modification of the pinhole array.

Since each of the array plates is antireflection-processed, normally, it is only necessary to take into account the angle of divergence of the non-reflected light beam shown by the solid line in FIGS. 11, 13 and 15 but when the amount of radiation is small or when a better reading accuracy is required, it is preferred that the angle of divergence of the once-reflected light beam shown by the broken line in FIGS. 11, 13 and 15 be taken into account. In the pinhole array 320, the angle of divergence of the once-reflected light beam is wider than in the pinhole array 310. Accordingly, it is preferred that pinhole array 340 shown in FIG. 17 be used in place of the pinhole array 320 when the angle of divergence of the once-reflected light beam is to be taken into account.

The pinhole array plate 340 is about 1 mm in thickness and formed by sandwiching a pair of array plates 321 between a pair of array plates 311. When the outermost array plates are array plates 311 having openings substantially the same as the pinholes in shape in positions corresponding to the respective pinholes, the angle of divergence of the once-reflected light beam can also be limited.

Figure 18:
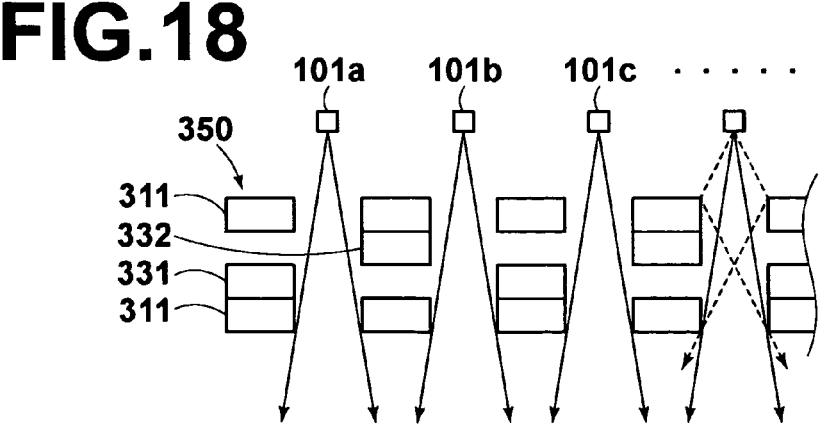
FIG. 18 is a cross-sectional view similar to FIG. 13 but showing still another modification of the pinhole array.

Similarly, pinhole array 350 shown in FIG. 18 can be used in place of the pinhole array 330.

The pinhole array plate 350 is formed by sandwiching array plates 331 and 332 between a pair of array plates 311. When the outermost array plates are array plates 311 having openings substantially the same as the pinholes in shape in positions corresponding to the respective pinholes, the angle of divergence of the once-reflected light beam can also be limited.

Though the light beam is emitted from a point of each LED chip in the above description for the purpose of simplification of the description, since the light beam is actually emitted from a surface of the LED chip, it is preferred that the pinhole array be formed taking into account this fact. When surface emitting LED chips are used, the minimum line width of the reading light beam L linearly collected on the electrostatic recording medium 10 is defined by the width of the opening 102a of the slit 102. Further, when end face emitting LED chips are used, the line width in the Y-direction of the light emitting area can be narrowed by positioning the LED chips so that the longitudinal direction of the light emitting area extends in the Z-direction and the reading light beam L linearly collected on the electrostatic recording medium 10 can be sufficiently small in the line width without use of the slit 102.

Each of the array plates need not be 250 μm thick but may be of any thickness so long as it can inexpensively produced by the known etching technology or the like. Further, the array plates making up one pinhole array may be different from each other in thickness.

Further, the shape of each pinhole in the pinhole array need not be square but may be rectangular, circular or ellipsoidal.

What is claimed is:

1. A reading light exposure system, which scans an image recording medium with a reading light beam, comprising
   a line source emitting the reading light beam,
   an optical means which converges the reading light beam emitted from the line source in a direction perpendicular to the longitudinal direction of the line source, and
   a hole array having a number of optical openings which limit the angle of divergence of the reading light beam in the longitudinal direction of the line source with respect to the optical axis of the optical means, wherein the improvement comprises that
   the length of each of the optical openings in the direction perpendicular to the longitudinal direction of the line source is larger than the length thereof in the longitudinal direction of the line source.

2. A reading light exposure system as defined in claim 1 in which the length of each of the optical openings in the direction perpendicular to the longitudinal direction of the line source is larger than 1.5 times the length thereof in the longitudinal direction of the line source.

3. A reading light exposure system as defined in claim 2 in which the length of each of the optical openings in the direction perpendicular to the longitudinal direction of the line source is larger than 2.0 times the length thereof in the longitudinal direction of the line source.

4. A reading light exposure system as defined in claim 1 in which the line source comprises a number of linearly arranged LEDs.

5. A reading light exposure system as defined in claim 1 in which the image recording medium is an electrostatic recording medium which generates an electric current according to an electrostatic latent image recorded thereon when exposed to reading light.

6. A reading light exposure system as defined in claim 1 in which the image recording medium is a stimulable phosphor sheet which emits instantaneous light according to the image information stored thereon when exposed to reading light.

7. A reading light exposure system as defined in claim 1, wherein the hole array has an antireflection surface to prevent the reflection of light.

8. A hole array having a number of through holes formed at the same intervals comprising:
   a plurality of hole array plates bonded together, each having optical openings formed in positions corresponding to the through holes,
   wherein the plurality of hole array plates have an antireflection surface to prevent the reflection of light in which at least one of the hole array plates has at least one optical opening which is larger in shape than the through hole.

9. A hole array as defined in claim 8 in which at least one of the outermost hole array plates has optical openings which are formed in positions each corresponding to each of the through holes and in shapes substantially the same as the corresponding through holes.

10. A hole array as defined in claim 9 in which the hole array comprises at least three hole array plates and the two outermost hole array plates have optical openings which are formed in positions each corresponding to each of the through holes and in shapes substantially the same as the corresponding through holes.

11. A hole array having a number of through holes comprising:
- a plurality of hole array plates bonded together, each having optical openings formed in positions corresponding to the through holes,
- wherein at least one of the hole array plates has at least one optical opening which is formed in a position corresponding to a plurality of the through holes and is shaped to include the through holes.

12. A light exposure system, comprising
a line source emitting a light beam,
an optical means which converges the light beam emitted from the line source in a direction perpendicular to the longitudinal direction of the line source, and
a hole array having a number of through holes formed at the same intervals which limit the angles of divergence of the light beams in the longitudinal direction of the line source with respect to the optical axis of the optical means, wherein the improvement comprises that the hole array is formed by a plurality of hole array plates bonded together, each having optical openings formed in positions corresponding to the through holes.

13. A light exposure system as defined in claim 12 in which at least one of the hole array plates has at least one optical opening which is larger in shape than the through hole.

14. A light exposure system as defined in claim 13 in which one of the two outermost hole array plates remoter from the line source has optical openings which are formed in positions each corresponding to each of the through holes and in shapes substantially the same as the corresponding through holes.

15. A light exposure system as defined in claim 14 in which the hole array comprises at least three hole array plates and the two outermost hole array plates has optical openings which are formed in positions each corresponding to each of the through holes and in shapes substantially the same as the corresponding through holes.

16. A light exposure system, comprising
a line source emitting a light beam,
an optical means which converges the light beam emitted from the line source in a direction perpendicular to the longitudinal direction of the line source, and
a hole array having a number of holes which limit the angles of divergence of the light beams in the longitudinal direction of the line source with respect to the optical axis of the optical means, wherein the improvement comprises that the hole array is formed by a plurality of hole array plates bonded together, each having optical openings formed in positions corresponding to the through holes,
wherein at least one of the hole array plates has at least one optical opening which is formed in a position corresponding to a plurality of the through holes and is shaped to include the through holes.

* * * * *